July 7, 1931.     J. A. MAYNARD     1,812,888
TEMPERATURE AND VACUUM RELIEF DEVICE
Filed May 14, 1929
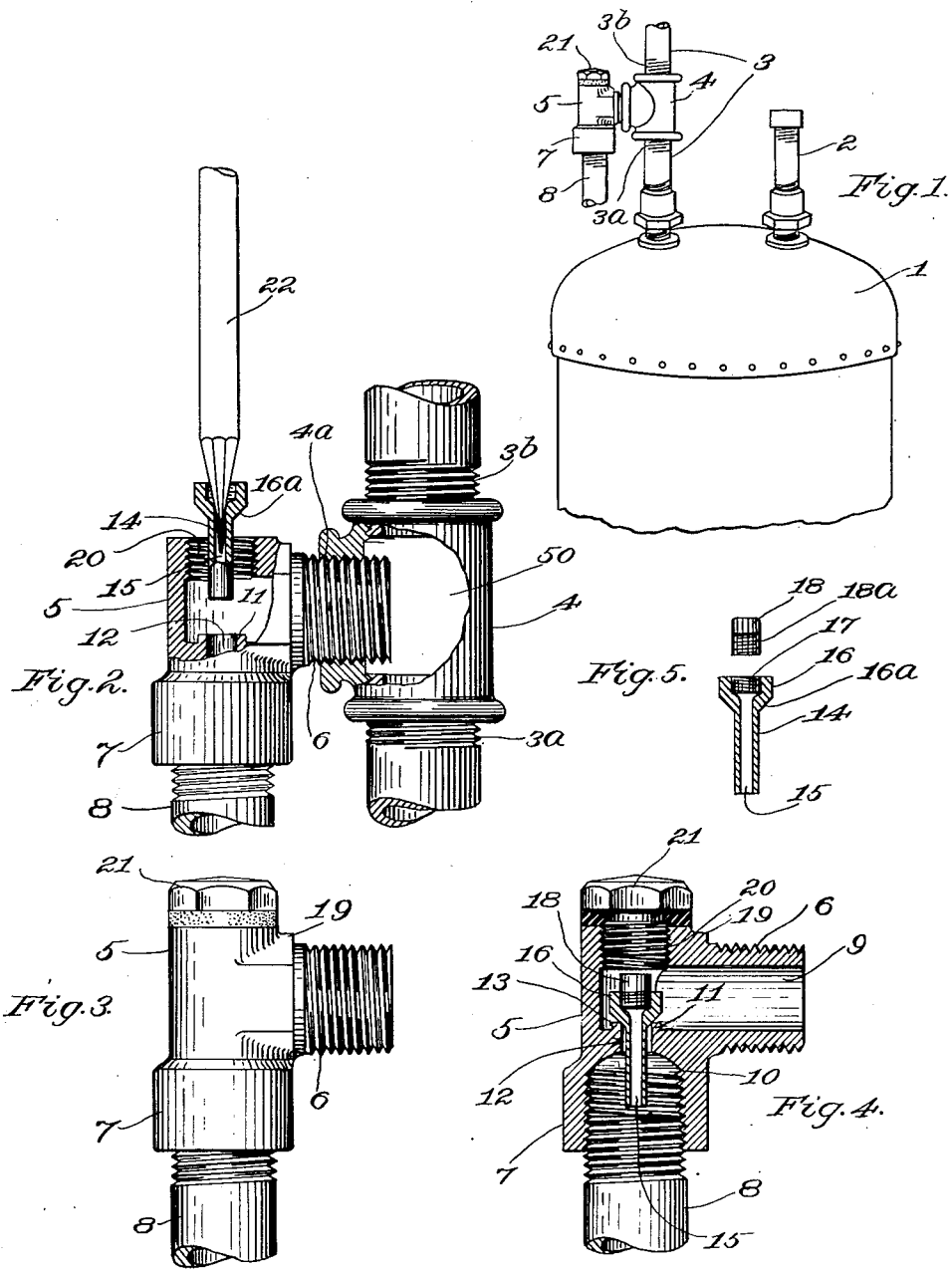
Inventor:
Joseph A. Maynard
By Macleod, Calver, Copeland & Dike
Attorneys.

Patented July 7, 1931

1,812,888

UNITED STATES PATENT OFFICE

JOSEPH A. MAYNARD, OF BOSTON, MASSACHUSETTS

TEMPERATURE AND VACUUM RELIEF DEVICE

Application filed May 14, 1929. Serial No. 362,929.

This invention relates to relief devices particularly adapted for use in hot water systems, such as hot water boilers, an object of the invention being to provide an improved relief valve device and fitting capable of being readily installed in a domestic hot water system; which will automatically provide the required relief against excessive temperature, especially in case the water in the boiler reaches the boiling point or thereabouts; which in addition is preferably constructed to afford vacuum relief against reduced pressure in the system or boiler; in which the temperature relief member or fusible element can be easily replaced; and in which the construction is relatively simple and cheap to manufacture.

This application is a continuation in part of my application Serial No. 748,081, filed November 6, 1924 and of my application Serial No. 126,881, filed August 3, 1926.

Other objects of this invention will appear in the following description and appended claims, reference being had to the accompanying drawings forming a part of this specification wherein like reference characters designate corresponding parts in the several views.

Fig. 1 is a fragmentary view illustrating the device installed in the cold water inlet pipe of a boiler.

Fig. 2 is a fragmentary sectional view illustrating the device in assembled relation in the boiler inlet pipe and showing the manner in which the temperature relief device may be removed and renewed.

Fig. 3 is a side elevation of the device embodying my invention.

Fig. 4 is a sectional view of the construction shown in Fig. 3.

Fig. 5 is a detail view illustrating the removable tube and fusible element.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings I have illustrated by way of example a present preferred form of my invention which is adapted to be inserted in the hot water system at any preferred location. In the present instance I have shown the device installed in the cold water supply pipe adjacent the boiler, although the invention is not limited to this arrangement of the parts. In Fig. 1 the upper portion of a domestic water boiler 1 is shown, this boiler having the usual hot water connection 2 and a cold water supply pipe 3 at the top of the boiler. Interposed in the length of this pipe 3 which is cut and threaded at its ends 3a and 3b, is a suitable fitting or coupling 4 illustrated in the present instance as a T-coupling. This coupling or fitting 4 is tapped and screwed onto the ends 3a and 3b of the cold water supply pipe. The relief device embodying the present invention preferably comprises a housing or casing 5 formed as an integral or single member. This casing member has a branch 6 which is exteriorly threaded and adapted to be screwed into the tapped portion 4a of the fitting 4. The casing member also has a branch 7 extending substantially at right angles to the branch 6. The latter is formed with an inlet chamber or passage 9 leading from the chamber 50 in the fitting 4. The branch 7 is provided with an outlet chamber or passage 10 and in the present instance is tapped to receive the threaded end of a suitable drain pipe 8.

The inlet and outlet chambers or passages 9 and 10 are separated by an integral partition or wall 11 which has a vertical duct or hole 12 therethrough providing a passage connecting the inlet and the outlet of the device. Adjacent the upper part of this passage 12 the wall or partition 11 is formed with a valve seat 13. Extending vertically through the opening 12 is a tube 14 which is preferably provided with an axial passage 15 extending entirely through the tube from top to bottom thereof. The main or lower portion of the tube is made smaller than the passage 12 so as to extend freely therethrough, and the upper end of the tube is enlarged to provide a head 16 the base of which is downwardly tapered or inclined at 16a so as to form a valve adapted to be seated on the valve seat 13. The enlarged upper end 16 of the tube 14 is counterbored and tapped at 17 to receive a fusible element or plug 18. This fusible plug is formed of suitable metal capable of fusing at the desired temperature, such as 210° F., and the metal of this plug is formed with exterior threads 18a permitting the plug to be threaded or screwed directly into the tapped counterbore 17 at the upper end of the removable tube 14.

Referring especially to Figs. 2 and 4 it will be seen that the casing member is also provided with an enlarged portion 19 which is formed with a vertical opening 20 in line with the passage 12 and opening into the inlet passage 9. The opening or hole 20 is tapped to receive the reduced threaded end of a plug 21 to which a wrench may be applied to tighten or loosen the plug and enable it to be removed.

From the foregoing it will be seen that the inlet and outlet openings of the casing in the foregoing structure are connected by means of two separate passages, namely the passage 12 extending through the partition wall 11, and the passage 15 extending through the tube 14. The valve 16 normally closes the passage 12 and forms a vacuum relief member which will be raised from its seat when the pressure in the boiler is below normal. The passage 15 is normally closed by means of the removable fusible element 18 which will fuse at high temperature. When the metal of the plug 18 fuses it will flow downwardly along the inclined threads in the counterbore 17 and thence downwardly through the passage 15, thereby insuring the opening of this passage when the temperature reaches the fusing point of the metal. When this occurs the plug 21 may be removed, see Fig. 2, and it is simply necessary for the workman to insert the pointed end of a pencil 22 through the opening 20 into the upper end of the passage 15 and draw out the tube 14. Thereupon a new plug 18 may be screwed into the tube and the latter replaced together with the plug 21.

What I claim is:

1. A relief device for hot water systems, such as a hot water boiler, comprising a housing having an inlet and an outlet, a wall, separating said inlet and outlet and having a passage therethrough, a valve seat carried by the wall, a removable tube extending through said passage and having an exteriorly formed vacuum valve engaging the seat to close said passage, said tube also having a passage therethrough, and a fusible plug directly threaded into the end of said tube and normally closing said last named passage.

2. A relief device for hot water systems, such as a hot water boiler, comprising a casing member having an inlet passage and an outlet passage at substantially right angles to each other, a partition wall separating said passages and having an opening therethrough forming a valve seat, a tube having an exterior vacuum valve resting on said seat and extending freely through the opening, and a fusible plug exposed in said inlet passage and closing a passage through the tube.

3. A relief device for hot water systems, such as a hot water boiler, comprising a casing member having an inlet passage and an outlet passage at substantially right angles to each other, a partition wall separating said passages and having an opening therethrough forming a valve seat, a tube having an exterior valve resting on said seat and extending freely through the opening, a fusible plug exposed in said inlet passage and closing a passage through the tube, and a removable plug opposite said fusible plug and closing an opening in the casing leading into said inlet passage.

4. A relief device comprising a casing having an inlet and outlet provided with a passage therebetween, a tube in said passage having a duct connecting the inlet and outlet, a wall dividing said passage and having an opening through which the tube extends, said wall carrying a valve seat and said tube having a vacuum valve supported on said seat, a fusible element normally closing the duct in the tube, and a removable plug carried by the casing opposite an end of the tube and normally closing an opening in the casing separate from said inlet and outlet and through which opening the tube is removable relative to said supporting wall.

In testimony whereof I affix my signature.

JOSEPH A. MAYNARD.